United States Patent [19]
Ernst et al.

[11] Patent Number: 5,816,759
[45] Date of Patent: Oct. 6, 1998

[54] EXPANSION ANCHOR AND METHOD THEREFOR

[75] Inventors: Richard J. Ernst, Palatine; Sigismund G. Paul, Park Ridge; Edward D. Yates, Chicago, all of Ill.

[73] Assignee: Illinois Tool Works Inc., Glenview, Ill.

[21] Appl. No.: 852,966

[22] Filed: May 8, 1997

[51] Int. Cl.⁶ .............................. F16B 13/04; F16B 13/06
[52] U.S. Cl. ................................ 411/24; 411/33; 411/55; 411/60
[58] Field of Search .................................. 411/24–28, 32, 411/33, 55, 60, 61

[56] References Cited

U.S. PATENT DOCUMENTS

| | | |
|---|---|---|
| 570,786 | 11/1896 | Church . |
| 660,559 | 10/1900 | Church . |
| 719,426 | 2/1903 | Boone . |
| 945,403 | 1/1910 | Mohun . |
| 1,120,367 | 12/1914 | Rohmer . |
| 1,120,408 | 12/1914 | Rohmer et al. . |
| 1,120,410 | 12/1914 | Rohmer et al. . |
| 1,639,231 | 8/1927 | Ogden . |
| 1,852,089 | 4/1932 | Pleister et al. . |
| 3,213,744 | 10/1965 | Wagner ..................................... 411/26 |
| 3,493,163 | 2/1970 | Hodil, Jr. . |
| 3,703,119 | 11/1972 | Lerich . |
| 3,742,809 | 7/1973 | Zifferer . |
| 3,766,819 | 10/1973 | Giannuzzi . |
| 3,911,782 | 10/1975 | Liebig . |
| 3,974,734 | 8/1976 | Machtle . |
| 4,056,037 | 11/1977 | McIntyre . |
| 4,100,834 | 7/1978 | Harris . |
| 4,114,654 | 9/1978 | Richardson . |
| 4,195,547 | 4/1980 | Giannuzzi . |
| 4,330,230 | 5/1982 | Giannuzzi . |
| 4,484,848 | 11/1984 | Ott . |
| 4,537,541 | 8/1985 | Giannuzzi . |
| 4,772,166 | 9/1988 | Shamah et al. . |
| 4,789,282 | 12/1988 | Abraham et al. . |
| 4,854,793 | 8/1989 | Ollivier et al. . |
| 4,904,135 | 2/1990 | Barthomeuf et al. . |
| 4,946,325 | 8/1990 | Abraham . |
| 5,161,916 | 11/1992 | White et al. . |
| 5,169,269 | 12/1992 | Tatematsu et al. . |
| 5,593,261 | 1/1997 | Giannuzzi . |

FOREIGN PATENT DOCUMENTS

| | | |
|---|---|---|
| 0099028 | 1/1984 | European Pat. Off. . |
| 1342215 | 9/1963 | France ....................................... 411/24 |
| 24 18 205 A1 | 11/1975 | Germany ......................... F16B 13/04 |
| 25 47 634 A1 | 4/1977 | Germany ......................... F16B 13/06 |
| 31 05 038 A1 | 9/1982 | Germany ......................... F16B 13/06 |
| 41 34 595 C1 | 3/1993 | Germany ......................... F16B 13/06 |
| WO9529341 | 11/1995 | WIPO . |

Primary Examiner—Neill R. Wilson
Attorney, Agent, or Firm—Schwartz & Weinrieb

[57] ABSTRACT

An expansion anchor installable in a pre-drilled hole formed in a base material. The expansion anchor includes a bolt having a shaft with a head portion, an opposing end portion, and a threaded portion. A shoulder is disposed on the shaft intermediate the head portion and the end portion thereof, and an expandable sleeve is disposed about the shaft between the shoulder and the end portion of the shaft. The expandable sleeve has an expandable upper sleeve portion and an expandable lower sleeve portion wherein the expandable lower sleeve portion is expandable outwardly before the expandable upper sleeve portion is expandable outwardly. A nut having a substantially conical surface is fixed rotationally in the pre-drilled hole and is engagable with the threaded portion of the shaft. The substantially conical surface of the nut is engageable with the expandable lower sleeve portion so as to expand the lower sleeve portion until the nut is axially fixed in the pre-drilled hole. The advancing bolt is subsequently drawn into the pre-drilled hole and the shoulder of the shaft is engagable with the expandable upper sleeve portion so as to outwardly expand the upper sleeve portion, whereby the expandable upper and lower sleeve portions are engageable with the wall of the pre-drilled hole so as to retain the expansion anchor therein.

20 Claims, 2 Drawing Sheets

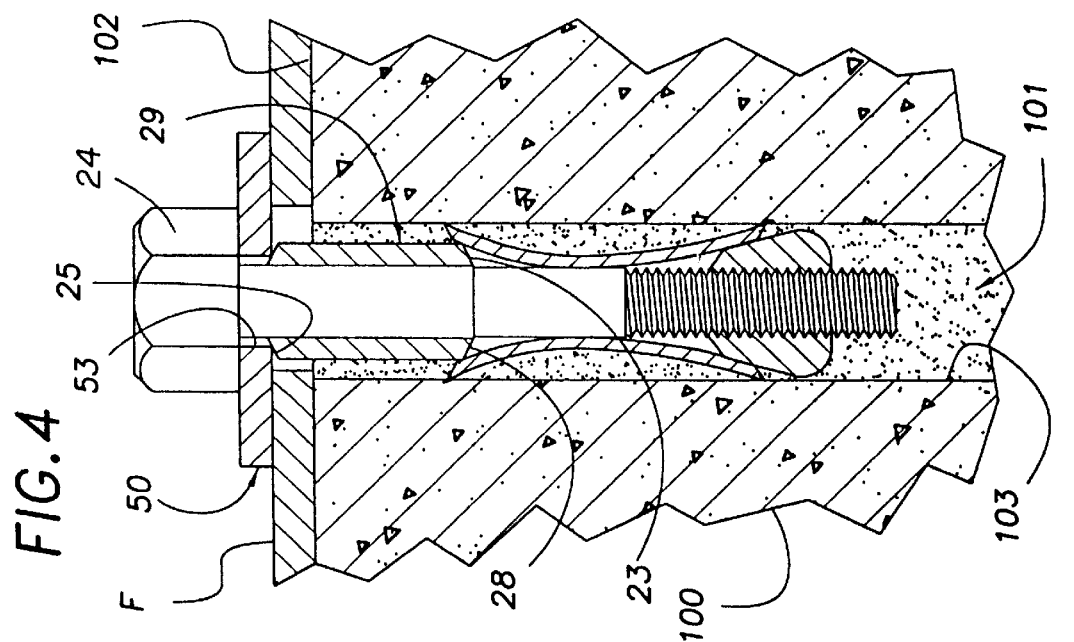

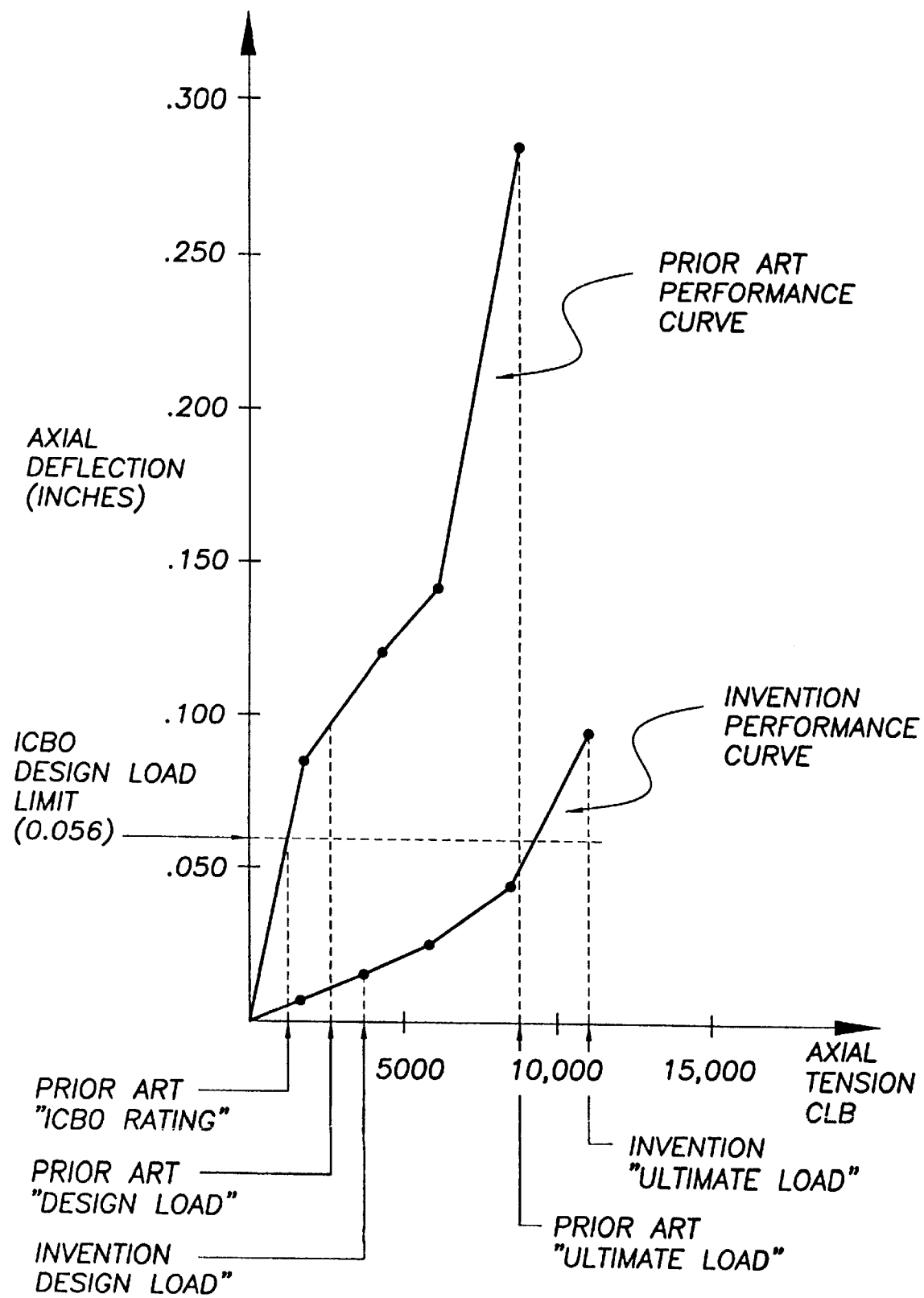

5,816,759

EXPANSION ANCHOR AND METHOD THEREFOR

FIELD OF THE INVENTION

The present invention relates generally to expansion anchors installable in pre-drilled holes and methods therefor, and more particularly to expansion anchors having an expandable sleeve which is expandable in and engageable with a wall portion of a pre-drilled hole formed in a base material for retaining the expansion anchor therein.

BACKGROUND OF THE INVENTION

Expansion anchors are known generally and used frequently for fastening objects, or fixtures, to a base material by installing the expansion anchor in a pre-drilled hole formed in the base material, which is often concrete, or brick, or mortar, or more generally any material suitable for receiving such an expansion anchor. An anchor known commonly as the Rawl-Bolt® anchor, for example, includes generally a hex head bolt having an extension sleeve and an expander sleeve separated by a nylon compression ring all disposed and retained about the bolt shaft by an expander cone, or nut. The expander cone is partially disposed about a threaded end portion of the bolt shaft, and an over-sized slotted end portion of the expander cone is compressed by the base material as the Rawl-Bolt® anchor is driven into the pre-drilled hole so as to prevent rotation of the nut during tightening of the bolt. As torque is applied to tighten the Rawl-Bolt® anchor, the expander cone is pulled toward the bolt head between the bolt shaft and the expansion sleeve so as to expand the expansion sleeve in the pre-drilled hole thereby engaging the wall of the hole. Further tightening of the Rawl-Bolt® anchor allegedly advances the threaded portion of the bolt shaft into the compressed end portion of the expander cone so as to subsequently outwardly expand the compressed expander cone, which thereby engages the wall of the pre-drilled hole in the base material. The nylon compression ring is crushed to permit the further tightening of the Rawl-Bolt® anchor after expansion of the expansion sleeve so as to draw the bolt against the fixture.

The expanded nut portion of the Rawl-Bolt® anchor, however, provides only limited additional anchoring performance since the compressed portion of the nut can not be expanded any further after the bolt shaft is driven fully through the nut. Most of the anchoring effect of the Rawl-Bolt® anchor thus results from the expansion of the expander sleeve. In addition, the nylon compression ring limits the extent to which the bolt can be further advanced into the pre-drilled hole after expanding the expansion sleeve thereby limiting the extent to which the fixture can be clamped against the surface of the base material. Also the location of the nylon compression ring about the shaft the Rawl-Bolt® anchor has a tendency to adversely affect the shear performance of the Rawl-Bolt® anchor. More specifically, the nylon compression ring results in a region of shear susceptibility between the upper sleeve and the expansion sleeve since the bolt shaft is not strengthened by either the metal upper sleeve or the metal expansion sleeve in the region of the compression ring.

The Rawl-Bolt® anchor requires that a nylon plug or other cap member cover an exposed end portion of the expander cone partially disposed about the threaded end portion of the bolt shaft so as to prevent damage to the threaded bore of the expansion cone prior to installation and while the expansion cone is initially driven into the pre-drilled hole. The Rawl-Bolt® anchor also includes adhesive tape applied partially over the expansion sleeve and the expander cone so as to prevent expansion of the expansion sleeve during shipping and handling prior to installation. The Rawl-Bolt® anchor is thus a relatively costly product as a result of the fabrication and assembly of its multiple components, including the formation of the slots on the expander cone, which is a particularly costly operation.

In view of the discussion above among other considerations, there exists a demonstrated need for an advancement in the art of expansion anchors and methods therefor.

OBJECTS OF THE INVENTION

It is therefore an object of the invention to provide novel expansion anchors and methods therefor that overcome problems in the prior art.

It is also an object of the invention to provide a novel expansion anchor and method therefor having improved anchoring performance.

It is another object of the invention to provide a novel expansion anchor and method therefor having improved anchoring performance by providing an expandable sleeve having expandable upper and lower sleeve portions engageable with a wall of a pre-drilled hole formed in a base material.

It is a further object of the invention to provide a novel expansion anchor and method therefor having improved shear performance by providing one or more sleeve portions about a full axial shaft portion between a bolt head portion and a nut of the expansion anchor, and by eliminating any compression ring or other material disposed about the shaft that compromises shear performance.

It is still another object of the invention to provide a novel expansion anchor and method therefor having improved anchoring performance by providing an expandable sleeve with expandable upper and lower sleeve portions, wherein the lower sleeve portion expands outwardly to engage a wall of a pre-drilled hole formed in a base material before the upper sleeve portion expands outwardly to engage the wall of the pre-drilled hole thereby permitting improved clamping of the expansion anchor and any fixture to the base material.

It is yet another object of the invention to provide a novel expansion anchor and method therefor having improved anchoring performance including improved shear performance and improved tension performance including reduced slippage for a particular applied tension, and also to provide an expansion anchor that complies with or exceeds accepted industry shear and tension performance standards.

BRIEF DESCRIPTION OF THE DRAWINGS

These and other objects, features and advantages of the present invention will become more fully apparent upon careful consideration of the following Detailed Description of the Invention and the accompanying Drawings, which may be disproportionate for ease of understanding, wherein like structure and steps are referenced by corresponding numerals and indicators throughout the several views, and wherein:

FIG. 1 is a partial sectional view of an expansion anchor assembled for installation in a pre-drilled hole formed in a base material according to an exemplary embodiment of the invention.

FIG. 2 is a perspective view of an expandable sleeve having an expandable upper sleeve portion and an expandable lower sleeve portion according to an exemplary embodiment of the invention.

FIG. 3 is a partial end view of an expansion anchor nut along lines 3—3 of FIG. 1.

FIG. 4 is a partial sectional view of an expansion anchor installed in a pre-drilled hole formed in a base material so as to clampingly retain a fixture thereupon according to an exemplary embodiment of the invention.

FIG. 5 is a comparative graphical illustration of expansion anchor performance curves for an expansion anchor according to the present invention and for a prior art expansion anchor.

DETAILED DESCRIPTION OF THE INVENTION

FIG. 1 is a partial sectional view of an expandable anchor 10 as assembled and configured prior to installation in a pre-drilled hole 101 formed in a base material 100, wherein the pre-drilled hole 101 has a pre-determined inner diameter and a generally cylindrical side wall 103, and FIG. 4 shows the expansion anchor 10 as configured after installation in the pre-drilled hole 101 of the base material 100. FIG. 1 shows the expansion anchor 10 comprising generally a bolt 20 with an expandable sleeve 30 disposed and retained about a shaft 22 by a nut 40. The expansion anchor 10 may alternatively include a washer 50 having a hole 52 for receiving the shaft 22. FIG. 4 shows the expansion anchor 10 clamping a fixture F between a washer 50 and a surface 102 of the base material 100. The fixture F may, for example, be a metal plate member, or a metal panel member of an electrical box, or more generally any other fixture member mountable onto the surface 102.

The bolt 20 includes a head portion 24, an opposing end portion 26 and a threaded portion 27. The head portion 24 in the exemplary embodiment is an enlarged hex head but is more generally any configuration that is engageable by a torque applying means for tightening the bolt 20, including eye-hooks and other members as discussed further herein. The bolt 20 also includes a shoulder 28 disposed on the shaft 22 between, or intermediate, the head portion 24 and the end portion 26 thereof. In the embodiment shown in FIG. 1, the shoulder 28 defines a transition between an upper shaft portion having an enlarged diameter and a smaller diameter lower shaft portion of a unitary bolt, commonly referred to as a shoulder bolt. In an alternative embodiment, not shown, the shoulder 28 is formed by an annular or partially annular protruding ridge portion of a unitary bolt. The shoulder 28 has a generally chamfered, or inclined, surface 23 at a predetermined angle relative to the longitudinal axis of the shaft 22 so as to facilitate and control the expansion of the expandable sleeve 30 as discussed further below.

In yet another alternative embodiment, the shoulder 28 is formed by a separate upper sleeve 29 disposeable over the bolt shaft 22 as shown in a partial sectional view of FIG. 1 and in FIG. 4. According to this embodiment, both lower and upper end portions of the separate sleeve member 29 have chamfered surfaces 23 and 25, respectively, and the washer 50 has an enlarged diameter opening 53 relative to the diameter of the shaft 22. The chamfered surface 25 on the upper end portion of the separate sleeve 29 is wedgeable between the enlarged diameter opening 53 of the washer 50 and the shaft 22 when the expandable anchor 10 is installed as shown in FIG. 4, thereby preventing the fixture F from becoming clamped between the upper end of the separate sleeve 29 and the washer 50, which may occur if the opening of the fixture F is offset relative to the hole 101, especially if fixture F is thin. The clamping of the fixture F between the upper end of the separate upper sleeve 29 and the washer 50 is necessarily to be avoided because it reduces shear performance of the anchor 10 since only the shaft 22 is available to resist shear forces along a portion of the anchor instead of the total diameter of both the shaft 22 and the upper sleeve 29. According to a related aspect of the invention, the chamfered surfaces 23 and 25 on the lower and upper end portions of the separate upper sleeve 29 have the same angle thereby eliminating the possibility of improper assembly of the expansion anchor 10.

The expandable sleeve 30 is disposed about the shaft 22 between the shoulder 28 and the end portion 26 of the shaft. In FIG. 1, the expandable sleeve 30 generally includes an expandable upper sleeve portion 32 and an expandable lower sleeve portion 34, wherein the expandable lower sleeve portion 34 is expandable outwardly before the expandable upper sleeve portion 32 is expandable outwardly for engaging and retaining the expansion anchor 10 in the pre-drilled hole 101 of the base material as discussed further below. FIG. 2 shows the expandable upper sleeve portion 32 including a plurality of at least two expandable upper fingers 33 and the expandable lower sleeve portion 34 including a plurality of at least two expandable lower fingers 35, wherein the fingers are defined by longitudinal slots 36 formed in the expandable sleeve 30. The expandable sleeve 30 of the exemplary embodiment includes four expandable upper fingers 33 and three expandable lower fingers 35. In another preferred embodiment, there are three expandable upper fingers 33 and three expandable lower fingers 35. In one configuration, shown best in FIG. 1, the expandable sleeve 30 includes bevelled inner edges 38 at opposite end portions of the expandable sleeve 30 so as to facilitate expansion of the expandable upper and lower sleeve portions 32 and 34 as discussed further below. Also, in the exemplary embodiment of FIG. 2, the expandable lower fingers 35 are longer than the expandable upper fingers 33 so as to facilitate expanding outwardly the expandable lower fingers 35 before expanding outwardly the expandable upper fingers 33 when the threaded portion 27 of the shaft 22 is advanced relative to the nut 40 as further discussed below. In other configurations, however, the expandable upper fingers 33 are substantially the same length as the expandable lower fingers 35 and alternative means are employed to facilitate expansion of the expandable lower fingers 35 before expansion of the expandable upper fingers 33.

The nut 40 includes a substantially conical surface 42 between a first end portion 43 of the nut having a first diameter and a second end portion 44 of the nut having a second diameter, wherein the first diameter is less than the second diameter. The substantially conical surface 42 of the nut is generally any wedge shaped surface suitable for expanding the expandable lower sleeve portion 34 as further discussed below, and thus the term substantially conical surface as used herein includes any generally wedge shaped surface including flat wedge shaped sectional portions of the nut 40 useable for said purpose. The substantially conical surface 42 is inclined at a predetermined angle relative to the axis of the shaft 22, which facilitates and controls expansion of the expandable sleeve 30 as discussed further below. The nut 40 also includes a threaded bore 45 engagable with the threaded portion 27 of the shaft 22 so as to permit the threaded shaft portion 27 to advance relative to the nut 40. The second end portion 44 of the nut 40 has a tapered portion 46, which facilitates driving the expansion anchor 10 into the pre-drilled hole as discussed further below. The nut 40 generally has a large diameter portion, which in the exemplary embodiment is at the second end portion 44, greater than the outer diameters of the bolt 20 including the upper sleeve 29 and the expansion sleeve 30 so that the nut 40 is engageable with the pre-drilled hole so as to prevent rotation of the nut 40 when the threaded portion 27 of the shaft 22 is engaged with and advanced through the nut 40 as discussed further below. In practice, however, the nut 40 may rotate in the pre-drilled hole 101 to some negligible extent, and is thus only substantially rotationally fixed therein. In one configuration, the nut 40 includes at least one flat surface 48 which forms at least one edge 49 on the large diameter portion that is engageable with the wall 103 of the pre-drilled hole, and in the exemplary embodiment of FIG. 3 the nut 40 includes four flat surfaces 48 which form corresponding edges 49 engageable with the wall 103 of the pre-drilled hole 101 so as to substantially eliminate any rotation of the nut 40 in the hole 101 during tightening of the bolt 20.

The expansion anchor 10 in the exemplary embodiment of FIG. 1 is shown as assembled and configured before installation in the pre-drilled hole 101 formed in the base material 100. According to this aspect of the invention, the threaded portion 27 of the shaft 22 is engaged with the threaded bore 45 of the nut 40, which retains the expandable sleeve 30 and any upper sleeve 29 on the shaft 22 of the bolt 20. As discussed above, an the outer diameter of the nut 40 is generally greater than the outer diameter of upper sleeve 29 and the outer diameter of the expandable lower sleeve 30, and the nut 40 is positioned along the threaded portion 27 of the shaft 22 so that the expandable sleeve 30 is not expanded outwardly beyond the outer diameter of the nut 40 to an extent that the lower sleeve 30 is substantially engageable with the wall 103 of the pre-drilled hole 101. In one pre-installation configuration, the expandable upper and lower sleeve portions 32 and 34 are expanded outwardly slightly so as to partially overlap the shoulder 28 and the substantially conical surface 42 of the nut 40, but again the upper and lower sleeve portions 32 and 34 are not expanded outwardly so far as to substantially engage the wall 103 thereby interfering with the insertion of the expansion anchor 10 in the pre-drilled hole 101.

According to a related aspect of the invention, at least the expandable lower sleeve portion 34 of the expandable sleeve 30 is overlappingly engageable with the conical nut 40 to prevent loosening of the conical nut 40 relative to the threaded portion 27 of the shaft 22 during assembly, shipping and handling of the anchor 10 prior to installation thereof, thereby eliminating the necessity of tape or other fastening means for said purpose, as is required in the prior art. Retainingly engaging the conical nut 40 about the shaft 22 has the advantage of preventing separation and loss of the nut and other components, and further preventing partial separation of the nut 40 from the shaft 22, which is to be avoided. Partial separation of the nut 40 from the shaft 22 has the adverse effect of exposing the threaded bore 45 of the nut to environmental elements and subjecting the threaded bore 45 to the collection of debris therein, which detrimentally effects operation and installation of the anchor 10. Thus, retainingly engaging the nut 40 with the expandable lower sleeve portion 34 prior to installation of the anchor 10 has the beneficial effect of preventing exposure of the threaded bore 45 of the nut 40 to environmental elements, and moreover eliminates the requirement of alternatively disposing in the threaded bore 45 of the nut 40 a plug or other member for the same purpose, as is required in the prior art.

According to another aspect of the invention, the outer diameter of the shoulder 28, and any upper sleeve 29 or equivalent, may be equal to or greater than the outer diameter of the expandable sleeve 30 but still less than the largest outer diameter of the nut 40 thereby protecting, and preventing premature expansion of, the expandable sleeve 30 while driving the expansion anchor 10 into the pre-drilled hole 101. The diameter of the upper sleeve 29 must however be large enough so that the gap between the upper sleeve 29 and the wall 103 of the pre-drilled hole 101 is sufficiently narrow to prevent the expandable sleeve 30 from merely riding up and over the upper sleeve 29. According to another aspect of the invention, the nut 40 is positioned along the threaded portion 27 of the shaft 22 so that the end portion 26 of the shaft 22 extends through at least the end portion of the nut 40 thereby protecting the threaded portion 27 of the shaft 22 and the threaded bore 45 of the nut 40 while driving the expansion anchor 10 into the pre-drilled hole. This also prevents debris from accumulating and lodging in the threaded bore 45 of the nut, and prevents deformation of the threaded bore 45 while axially driving the expansion anchor 10 into the pre-drilled hole 101, as discussed above.

In one embodiment, the expansion anchor 10 is designed for installation in a pre-drilled hole 101 formed, for example, with a ⅝ inch drill bit and having a pre-drilled hole diameter between approximately 0.650 inches and approximately 0.660 inches, which may be more or less depending, among other factors, on the type of drill bit, the base material, and drilling conditions. According to this exemplary embodiment, the outer diameter of the shoulder 28 and any upper sleeve portion 29 is between approximately 0.635 inches and approximately 0.640 inches, the outer diameter of the expandable sleeve 30 before significant expansion is between approximately 0.610 inches and approximately 0.615 inches, and the largest outer diameter of the nut 40 is between approximately 0.670 inches and approximately 0.675 inches. The diameter of the upper sleeve 29 may be increased so as to improve shear performance. As stated earlier, the spacing between the outer diameter of the shoulder 28, including the outer diameter of the upper sleeve 29, and the wall 103 of the pre-drilled hole 101, however, must not be so large as to permit the expandable sleeve 30 to move freely therebetween without engaging the wall 103 of the hole 101 during tightening of the bolt 20 as discussed below.

During the initial phase of installation, the expansion anchor 10 is driven axially by an external force into the pre-drilled hole 101 wherein the tapered end portion 46 of the nut 40 facilitates driving the expansion anchor 10 into the pre-drilled hole. In one installation configuration, the expansion anchor 10 is driven axially into the pre-drilled hole 101 until the head portion 24 or an underside of the washer 50 is seated on a surface 102 of the base material 100. In other installation configurations, the expansion anchor 10 is driven axially into the pre-drilled hole 101 so as to clamp the fixture F between the head portion 24 or washer 50 of the expansion anchor 10 and the surface 102 of the base material 100 as shown in FIG. 4. In either installation configuration, the expansion anchor 10 and any fixture are ultimately clamped onto the surface 102 of the base material 100 upon subsequently tightening the bolt 20 by application of a torque as further discussed below. And in embodiments that include a separate upper sleeve 29 and enlarged washer opening 53, the chamfered surface 25 of the upper end portion of the upper sleeve 29 is wedged between the washer 50 and shaft 22 so as to prevent clamping the fixture F between the upper sleeve 29 and the washer 50 as discussed above.

After the expansion anchor 10 is driven axially into the pre-drilled hole 101, a torque is applied to the bolt 20 so as to tighten and advance the bolt 20 relative to the nut 40, which is fixed rotationally in the pre-drilled hole 101. As the bolt 20 is tightened relative to the nut 40, the nut 40 is initially drawn axially toward the bolt head 24 between the shaft 22 and the expandable lower sleeve portion 34 so as to engage the substantially conical surface 42 of the nut 40 with the expandable lower sleeve portion 34 and to engage the shoulder 28 with the expandable upper sleeve portion 32. According to one aspect of the invention, the expandable lower sleeve portion 34 is expanded outwardly before the expandable upper sleeve portion 32 is expanded outwardly, wherein the expandable lower sleeve portion 34 expands outwardly as the nut 40 moves upwardly, or out of the hole 101, until the expandable lower sleeve portion 34 engages the wall 103 of the hole 101 and substantially prevents further axial movement of the nut 40 thereby axially fixing the nut 40 in the hole 101. As the nut 40 approaches its axially fixed position in the hole 101, the bolt 20 begins to advance into the hole 101 resulting in the outward expansion of the expandable upper sleeve portion 32 thereby clamping the expansion anchor 10 and any fixture onto the surface 102 of the base material 100. According to this aspect of the invention, the clamping action of the expansion anchor 10 is not limited by the dimensions of a compressible member, as in prior art anchors, but is instead limited by the much greater range of axial displacement permitted by the expansion of the expandable sleeve 30, which results in improved clamping performance. Also, continued tightening of the bolt 20 continues to increase the outward expansion of the expandable sleeve 30 resulting in still greater lateral forces applied by the expansion sleeve 30 on the wall 103 of the hole 101, which results in improved anchoring performance of the expansion anchor 10. The upper sleeve 29 and the expandable sleeve 30 disposed along the entire shaft portion between the head portion 24 of the bolt 20 and the nut 40 increase the overall diameter of the expansion anchor 10, thereby strengthening and improving the shear performance of the expansion anchor 10.

In one configuration of the expansion anchor 10, the expandable lower fingers 35 expand outwardly into engagement with the wall 103 of the hole before the expandable upper fingers 33 expand outwardly into engagement with the wall 103 of hole as a result of the expandable lower fingers 35 being longer than the expandable upper fingers 33. In another configuration of the expansion anchor 10, the expandable lower sleeve portion 34 expands outwardly into engagement with the wall 103 of the pre-drilled hole 101 before the expandable upper sleeve portion 32 expands outwardly into engagement with the wall 103 of the pre-drilled hole as a result of the first angle at which the chamfered surface 23 of the shoulder 28 is inclined relative to the axis of the shaft 22 being greater than the second angle at which the substantially conical surface 42 of the nut 40 is inclined relative to the axis of the shaft 22. According to this latter configuration of the invention, the expandable upper and lower fingers 33 and 35 of the expandable sleeve 30 may have the same length since the expansion sequence of the expandable upper and lower sleeve portions 32 and 34 is controlled by the first and second inclination angles of the chamfered surface 23 of the shoulder 28 and the substantially conical surface 42, respectively. In another configuration, the expansion sequence of the expandable upper and lower sleeve portions is controlled by a combination of the features and configurations discussed above. In operation, there may be some overlap between the expansion of the lower sleeve portion 34 and upper sleeve portion 32 but, generally, the lower sleeve portion 34 begins to expand outwardly before the upper sleeve portion 32 begins to expand outwardly, and the lower sleeve portion 34 engages the wall 103 of the hole 101 so as to axially fix the position of the nut 40 in the hole, thereby permitting axial displacement of the bolt 20 into the hole to more fully outwardly expand the upper sleeve portion 32 and to effectively clamp the expansion anchor 10 and any fixture to the base material 100.

FIG. 5 is a comparative graphical illustration of expansion anchor performance curves for a ⅝ inch expansion anchor according to the present invention and for a ⅝ inch prior art Rawl-Bolt® anchor of the type discussed herein above. More specifically, the curves illustrate that the expansion anchor of the present invention continues to perform under a relatively high axial tension, characterized as an Ultimate Load, in comparison to the Rawl-Bolt® anchor. The Ultimate Load is an average axial tension measured prior to failure of the expansion anchor, which failure may be withdrawal of the expansion anchor from the pre-drilled hole. The curves also show that the Design Load, which is approximately 25 percent of the Ultimate Load, for the expansion anchor of the present invention is, accordingly, relatively high in comparison to the Design Load for the prior art Rawl-Bolt® anchor.

Also, the curves of FIG. 5 show axial slippage, or deflection, as a function of axial tension for an expansion anchor according to the present invention and for the prior art Rawl-Bolt® anchor. The curves, though non-linear, indicate that the axial deflection for the prior art Rawl-Bolt® anchor is approximately a factor of 3 times greater than the axial deflection for an expansion anchor according to the present invention at the Design Load and at the Ultimate Load. The expansion anchor of the present invention thus provides remarkably improved retention performance relative to prior art expansion anchors.

Another feature shown by the graphical illustration of FIG. 5 is the relationship between the expansion anchor performance curves and the International Conference of Building Officials industry standard (ICBO Standard) allowable Design Load Limit for axial deflection. The ICBO Standard actually specifies allowable deflection Limits at both the Design Load and the Ultimate Load, which determines the ICBO Standard tension rating applied to a particular expansion anchor. FIG. 5 shows that the prior art Rawl-Bolt® anchor axial deflection at 25 percent of its Ultimate Load far exceeds the ICBO Standard allowable Design Load Limit of 0.056 inches axial deflection for a 5/8 inch expansion anchor, which reduces substantially the Design Load axial tension rating applied to the Rawl-Bolt® anchor under the ICBO Standard. More specifically, the Design Load axial tension rating under the ICBO Standard corresponds to the axial tension at the intersection of the ICBO Standard Design Load Limit and the curve for the Rawl-Bolt® anchor in cases where axial slippage at 25 percent of the Ultimate Load is greater than the ICBO Standard Design Load Limit for axial slippage. In contrast, the axial deflection for the expansion anchor according to the present invention at 25 percent of its Ultimate Load is well within the ICBO Standard Design Load Limit of 0.056 inches for a ⅝ inch expansion anchor. The Design Load axial tension rating of the expansion anchor according to the present invention is thus rated at a full 25 percent of its Ultimate Load.

While the foregoing written description of the invention enables anyone skilled in the art to make and use what is at present considered to be the best mode of the invention, it will be appreciated and understood by anyone skilled in the art the existence of variations, combinations, modifications and equivalents within the spirit and scope of the specific exemplary embodiments disclosed herein. The present invention therefore is to be limited not by the specific exemplary embodiments disclosed herein but by all embodiments within the scope of the appended claims. It is therefore to be understood that within the scope of the appended claims, the present invention may be practiced otherwise than as specifically described herein.

What is claimed is:

1. An expansion anchor, installable in a pre-drilled hole having a generally cylindrical wall, comprising:
   a bolt having a shaft with a head portion, an opposite end portion, a longitudinal axis, and a threaded portion;
   a shoulder disposed upon said shaft intermediate said head portion and said opposite end portion of said shaft;
   an expandable sleeve disposed about said shaft between said shoulder and said opposite end portion of said shaft, wherein said expandable sleeve has an expandable upper sleeve portion comprising at least two expandable upper fingers, and an expandable lower sleeve portion comprising at least two expandable lower fingers;
   a nut having a substantially conical surface portion defined between a first portion of said nut having a first diameter and a second portion of said nut having a second diameter, said nut also having a threaded bore engageable with said threaded portion of said shaft;
   said substantially conical surface portion of said nut being engageable with said expandable lower sleeve portion while said shoulder is engageable with said expandable upper sleeve portion when said threaded portion of said shaft is advanced relative to said threaded bore of said nut so as to respectively expand said expandable lower sleeve portion and said expandable upper sleeve portion such that said expandable lower sleeve portion and said expandable upper sleeve portion are engageable with the wall of the pre-drilled hole; and
   means for causing outward expansion of said expandable lower sleeve portion prior to outward expansion of said expandable upper sleeve portion when said threaded portion of said shaft is advanced through said threaded bore of said nut.

2. The expansion anchor of claim 1, wherein:
   said means for causing said outward expansion of said expandable lower sleeve portion prior to said outward expansion of said expandable upper sleeve portion comprises means for forming said expandable lower fingers to be longer than said expandable upper fingers.

3. The expansion anchor of claim 1, wherein:
   said means for causing said outward expansion of said expandable lower sleeve portion prior to said outward expansion of said expandable upper sleeve portion comprises means for forming said shoulder of said shaft to be inclined at a first angle relative to said longitudinal axis of said shaft which is greater than a second angle at which said substantially conical surface of said nut is inclined relative to said longitudinal axis of said shaft.

4. The expansion anchor of claim 3, wherein further:
   said at least two expandable lower fingers of said expandable lower sleeve portion are longer than said at least two expandable upper fingers of said expandable upper sleeve portion.

5. The expansion anchor of claim 1, the nut having an outer diameter greater than an outer diameter of the shaft and an outer diameter of the expandable sleeve, wherein the nut is engageable with the wall of the pre-drilled hole to prevent rotation of the nut when the threaded portion of the shaft is advanced relative to the threaded bore of the nut.

6. The expansion anchor of claim 5, the nut including at least one edge engageable with the wall of the pre-drilled hole to prevent rotation of the nut when the threaded portion of the shaft is advanced relative to the threaded bore of the nut.

7. The expansion anchor of claim 5, wherein:
   an outer diameter of the shoulder is greater than an outer diameter of the expandable sleeve.

8. The expansion anchor of claim 1, further comprising an upper sleeve disposed between the head portion of the bolt and the expandable sleeve, wherein a shaft portion of the bolt between the head portion and the nut is covered by one of the upper sleeve and the expandable sleeve to improve shear performance of the expansion anchor.

9. The expansion anchor of claim 1, further comprising a separate upper sleeve disposed between the head portion of the bolt and the expandable sleeve, and a washer disposed between the head portion of the bolt and the separate upper sleeve, the separate upper sleeve having chamfered upper and lower ends, and the washer having a hole larger than a diameter of the bolt shaft, wherein the chamfered upper end of the separate upper sleeve is wedgeable between the washer and the bolt shaft.

10. The expansion anchor as set forth in claim 1, wherein:
    said at least two expandable upper fingers of said expandable upper sleeve portion comprises four expandable upper fingers; and
    said at least two expandable lower fingers of said expandable lower sleeve portion comprises three expandable lower fingers.

11. The expansion anchor as set forth in claim 1, further comprising:
    axially extending slot means respectively defined within said expandable upper and lower sleeve portions of said expandable sleeve for defining said at least two expandable upper fingers and said at least two expandable lower fingers.

12. A method for installing an expansion anchor in a pre-drilled hole having a substantially cylindrical wall, wherein the expansion anchor comprises a bolt having a shaft with a head portion, a longitudinal axis, a threaded portion, a shoulder disposed upon said shaft intermediate said head portion and said threaded portion, and an opposite end portion, an expandable sleeve disposed about the shaft so as to be interposed between said shoulder and said opposite end portion of said shaft, said expandable sleeve having an expandable upper sleeve portion comprising at least two expandable upper fingers, and an expandable lower sleeve Portion comprising at least two expandable lower fingers, and a nut having a substantially conical surface portion defined between a first portion of said nut having a first diameter and a second portion of said nut having a second diameter, and a threaded bore disposed about said threaded portion of the shaft, the method comprising the steps of:
    substantially rotationally fixing the nut in the pre-drilled hole by engaging the nut with a wall portion of the pre-drilled hole;
    advancing the bolt relative to the nut by applying a tightening torque to the bolt;
    outwardly expanding said at least two expandable lower fingers of said expandable lower sleeve portion of the expandable sleeve by engaging said substantially conical surface portion of the nut with the expandable lower sleeve portion as the bolt is advanced relative to the nut;

outwardly expanding said at least two expandable upper fingers of said expandable upper sleeve portion of the expandable sleeve by engaging said shoulder on the shaft with the expandable upper sleeve portion as the bolt is advanced relative to the nut; and providing said expansion anchor with means for causing outward expansion of said expandable lower sleeve portion before outward expansion of said expandable upper sleeve portion.

13. The method as set forth in claim 12, further comprising the steps of:

providing said expandable upper sleeve portion with four expandable upper fingers; and providing said expandable lower sleeve portion with three expandable lower fingers.

14. The method as set forth in claim 12, further comprising the step of:

respectively providing axially extending slots within said expandable upper and lower sleeve portions of said expandable sleeve so as to respectively provide said expandable upper and lower sleeve portions with said at least two expandable upper and lower fingers.

15. The method as set forth in claim 12, further comprising the step of:

providing said shoulder of said shaft upon a sleeve member which is separate from said expandable sleeve and which is disposed around said shaft of said bolt.

16. The method of claim 12 further comprising the steps of:

outwardly expanding the expandable lower sleeve portion of the expandable sleeve by axially moving the nut along the threaded portion of the shaft until the nut is axially fixed in the pre-drilled hole; and advancing the bolt into the pre-drilled hole so as to cause said shoulder of said shaft to outwardly expand the expandable upper sleeve portion and thereby clamp the expansion anchor upon the wall of the pre-drilled hole after the nut is axially fixed in the pre-drilled hole.

17. The method of claim 12, wherein said step of providing said expansion anchor with means for causing outward expansion of said expandable lower sleeve portion before outward expansion of said expandable upper sleeve portion further comprises the step of:

forming said expandable lower fingers of said expandable lower sleeve portion to be longer than said expandable upper fingers of said expandable upper sleeve portion.

18. The method of claim 16 further comprising engaging the nut with the wall of the pre-drilled hole so as to substantially prevent rotation of the nut as the bolt is advanced relative to the nut.

19. The method of claim 12, wherein said step of providing said expansion anchor with means for causing outward expansion of said expandable lower sleeve portion before outward expansion of said expandable upper sleeve portion further comprises the step of:

forming said shoulder of said shaft so as to be inclined at a first angle relative to said longitudinal axis of said shaft which is greater than a second angle at which said substantially conical surface of said nut is inclined relative to said longitudinal axis of said shaft.

20. The method as set forth in claim 19, wherein said step of providing said expansion anchor with means for causing outward expansion of said expandable lower sleeve portion before outward expansion of said expandable upper sleeve portion further comprises the step of:

forming said expandable lower fingers of said expandable lower sleeve portion to be longer than said expandable upper fingers of said expandable upper sleeve portion.

* * * * *